United States Patent [19]

Davidge et al.

[11] 4,333,639
[45] Jun. 8, 1982

[54] RECIRCULATING DOCUMENT FEED FOR ELECTROPHOTOGRAPHIC APPARATUS

[75] Inventors: Ronald V. Davidge, Boulder; Carl A. Queener, Lyons, both of Colo.; James T. Vanderslice, Wilton, Conn.

[73] Assignee: International Business Machines Corporation, Armonk, N.Y.

[21] Appl. No.: 181,574

[22] Filed: Aug. 27, 1980

[51] Int. Cl.³ .............................................. B65H 5/22
[52] U.S. Cl. .................................. 271/3.1; 271/186; 271/301
[58] Field of Search ......................... 271/3.1, 301, 186

[56] References Cited

U.S. PATENT DOCUMENTS

| | | | |
|---|---|---|---|
| Re. 27,976 | 4/1974 | Sahley | 355/64 |
| T957,006 | 4/1977 | Reid | 271/3.1 |
| 2,822,172 | 2/1958 | Mayo et al. | 271/74 |
| 3,536,320 | 10/1970 | Derby | 271/50 |
| 3,552,739 | 1/1971 | Roberts et al. | 271/4 |
| 3,799,537 | 3/1974 | Cobb | 271/3 |
| 3,937,454 | 2/1976 | Colwill | 271/6 |
| 3,963,345 | 6/1976 | Stemmle et al. | 355/50 |
| 4,008,956 | 2/1977 | Stemmle | 355/8 |
| 4,057,341 | 11/1977 | Sohm | 355/8 |
| 4,076,408 | 2/1978 | Reid et al. | 355/14 |
| 4,093,372 | 6/1978 | Guenther | 355/50 |
| 4,099,150 | 7/1978 | Connin | 355/3 R |
| 4,136,862 | 1/1979 | Kunz | 271/186 |
| 4,169,674 | 10/1979 | Russel | 355/14 |
| 4,184,671 | 1/1980 | Sasamori | 271/18 |
| 4,212,457 | 7/1980 | Guenther | 271/288 |
| 4,231,561 | 11/1980 | Kaneko | 271/3.1 |

FOREIGN PATENT DOCUMENTS 1512367 6/1978 United Kingdom ................ 271/3.1

OTHER PUBLICATIONS

IBM Technical Disclosure Bulletin, Research Disclosure, IBM Technical Disclosure Bulletin, "Dual Mode Copying System," T. A. Hoskins and M. J. Miller, Jun. 1969, p. 173.
Research Disclosure, "Recirculating Document Feeder", Article 17247, Aug. 1978.

Primary Examiner—Richard A. Schacher
Attorney, Agent, or Firm—Gunter A. Hauptman

[57] ABSTRACT

Documents are automatically recirculated for copying by a copier from a stack which is accessed top document downward. Documents are stacked faceup in an upper tray and moved as a group to a lower tray where they are stacked facedown, with the first document in the upper tray appearing in a facedown position at the bottom of the lower tray. The top document in the lower tray is then removed for copying and returned to the bottom of the upper tray, thus peserving the original document order for further copying. The copier normally scans stationary documents placed on a glass platen; for example, individual sheets of paper or book pages may be placed on the glass platen and held stationary while the optics causes light to scan the page. During automatic recirculation of stacks of the documents, however, the scanning optics is "parked" and documents removed from the lower tray are imaged while scanned past a fixed exposure area on the glass plater on the way back to the upper tray.

4 Claims, 7 Drawing Figures

RECIRCULATING DOCUMENT FEED FOR ELECTROPHOTOGRAPHIC APPARATUS

BACKGROUND OF THE INVENTION

1. Field of the Invention

The invention relates to electrophotographic copiers and, more particularly, to document handling in electrophotographic copiers permitting stacks of originals to be automatically copied a desired number of times.

2. Description of the Prior Art

There are essentially two ways of copying original documents and placing the copies in a desired order when more than one original is the source of copies. A collator may be provided to place copies into bins in sequence determined by the number of originals. In this case, each original is held for copying the desired number of copies and then the next original is chosen. Collators require significant amounts of physical room and are mechanically complex. An alternative approach is to make one copy from each original, thus stacking the copies in the same sequence as the originals, and then recirculate the originals for further copying. This gives a single stack of correctly-sequenced copies, but has the disadvantage of causing additional handling of the original. Automatic recirculation, in the prior art, is obtained by removing original sheets from a stack bottom, placing them on a document platen, exposing the document for purposes of copying and then returning the original to the top of the stack. This operation involves at least two significant shortcomings.

First, removal of sheets from the bottom of a stack introduces the possibility of damage to the original because the force bearing on the bottom of the stack is subject to many variables such as the number of originals provided. Second, the speed of operation is dependent upon the speed at which the original can be exposed as well as the speed at which it can be removed and returned to the stack. Therefore, due to the long mechanical path involved, this technique is often limited to "flash exposure" of the original as opposed to scanning the original with a bar of light. In instances where the latter approach is desirable, the described approach is not practical.

In U.S. Pat. No. 4,099,150 by John Lyman Connin, assigned to Eastman Kodak Company, and filed June 1, 1976, there is disclosed an apparatus for producing duplex copies in an automatic recirculating document feed copier. Originals are removed from the top of a stack in a first tray and fed to a second stack from which they are removed, bottom first, for copying. They are then returned after use to the top of the first stack for reuse. This approach has the disadvantage of reconstructing the upper tray in reverse order and retains the problem of removing sheets from the bottom of a stack.

SUMMARY OF THE INVENTION

In a copier using scanning optics to sequentially scan stationary documents with a bar of light synchronized with the rotation of a photoconductive drum, apparatus is provided for "parking" the optics to permit an original document to pass an exposure area, causing the document to be scanned by the stationary bar of light while it moves during automatic recirculation. The automatically recirculating documents are initially stacked in a first orientation in a first tray from which they are moved and inverted as a group to be placed in a second tray. Each document passes the exposure area while returning from the second tray to the first tray. The orientation of the documents in the first tray is always retained in the desired initial sequence. All documents are removed from the stack in the second tray by removing them from the top. The documents are thus presented to the copier in reverse sequential order; i.e., the last document is copied first and the first document is copied last. This is the preferred order for a copier which stacks its output copies in the normal way, "faceup" (i.e., side to be copied facing upward). It is also possible to arrange the paper path of the copier so that output copies are stacked "facedown".

DESCRIPTION OF THE PREFERRED EMBODIMENT

Figure 1:
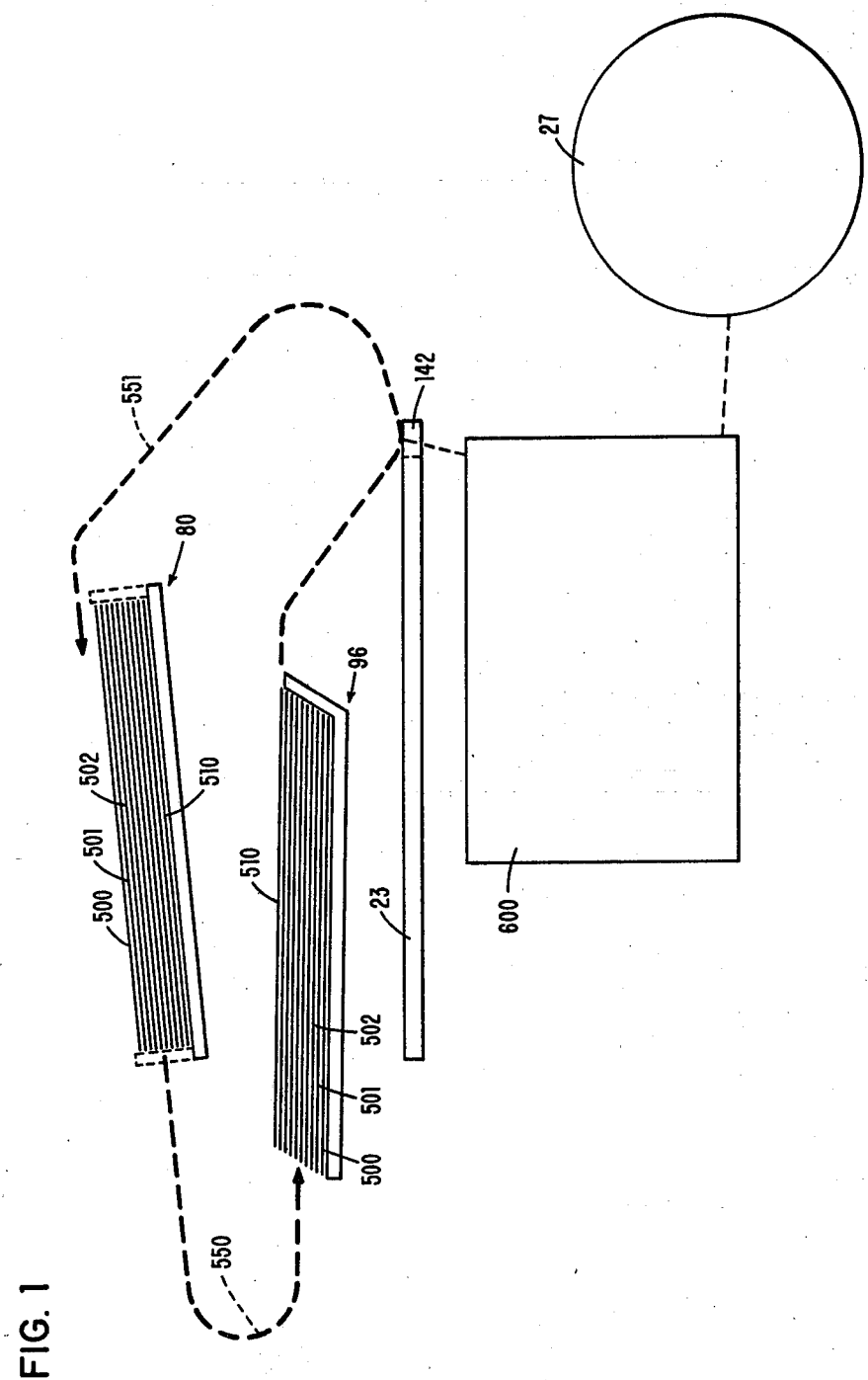
FIG. 1 is a schematic outline drawing illustrating the invention.

Referring to FIG. 1, original documents are placed faceup in an upper tray 80 with the first document 510 to be copied at the bottom of the stack and the last document 500 to be copied at the top of the stack. Prior to copying, the documents 500 through 510 are moved via path 550 to lower tray 96 where the documents are placed in the same sequence facedown. Thus in lower tray 96, the first document 510 to be copied is at the top of the stack facedown and the last document 500 to be copied is at the bottom of the stack facedown. The documents 500 through 510 are now in position for copying by a copier including a glass platen 23, scanning optics 600 and a photoconductor drum 27. In normal operation, the scanning optics 600 causes a bar of light to scan across documents placed on the glass platen 23 in synchronism with the rotation of the drum 27 so that an image of the document appears on the drum 27. This normal operation is desirable for stationary objects, such as book pages, placed on the glass platen 23. However, during automatic recirculating document feed, which supplies copies of documents in the same sequence in which the documents are supplied to the glass platen, increased speed of operation can be obtained by causing the scanning optics 600 to be "parked" in a fixed position providing a single lighted area 142 on the glass platen 23. Then, when a document passes the area 142 in synchronism with the rotation of the drum 27, the image of the document will be formed on the drum 27 in the same manner as during scanning.

Documents 500–510 are removed from the lower tray 96 and past the exposure area 142 in path 551 prior to return to the upper tray 80. The first document 510, removed from the lower tray 96, thus is placed faceup at the top of the upper tray 80 after exposure by the "parked" scanning optics 600. In this way, all of the documents 500-510 are exposed and returned to their original positions in the upper tray 80. A complete set of copies is thus generated for each recirculation of the documents 500-510 from the lower tray 96 to the upper tray 80. Thereafter, the documents 500-510 are returned to the lower tray 96 as previously described. It is also possible to arrange the paper path of the copier paper path of the copier so that output copies are stacked facedown. If this is done, it is desirable to present the documents 500-510 to the copier in forward sequential order; i.e., so that the first document is copied first and the last document is copied last. The invention described herein may be employed with such a copier if its components are rearranged so that documents placed in the upper tray faceup are fed one by one, with the top document 500 being fed first, from the upper tray 80 past the copier optics 600 to be stacked facedown in the lower tray 96. When all of the documents are thus fed and stacked, they are moved as a group to their original position in the upper tray 80 either by transferring the stack between fixed trays 96 and 80 or by causing one of the trays 96 to pivot over the other tray 80, thus dropping the stack from the movable tray 96 to the fixed tray 80.

DESCRIPTION OF THE COPIER

Figure 2:
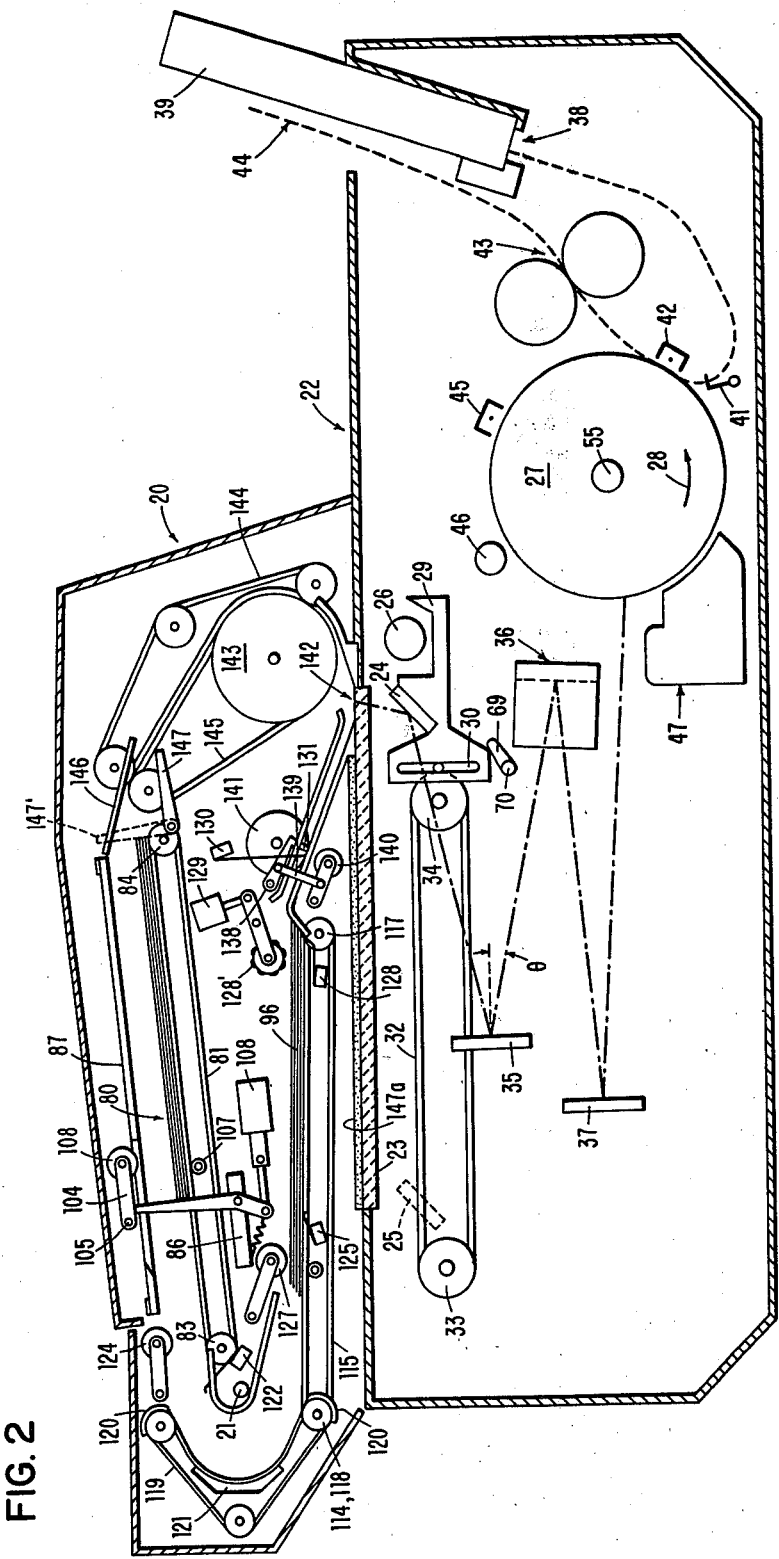
FIG. 2 is a diagrammatic front sectional view of the copier and of the document feeder showing the major elements thereof.

Referring to FIG. 2, a recirculating document feeder 20 is pivotably mounted along the axis of a shaft 21 atop a compact copier 22, which is otherwise adapted to copy documents placed atop a glass platen 23 as first scanning mirror 24 is driven between the position in which it is shown and position 25 in synchronization with the rotation of photoconductor drum 27 in the direction of arrow 28. This mirror 24 is mounted on a scanning carriage 29 which is driven through a yoke slot 30 by a pin 31 attached to a toothed belt 32 extending between a driven pulley 33 and idler pulley 34. Illumination lamp 26 is also mounted on scanning carriage 29. A second scanning mirror 35 is also driven along a line at an angle $\theta$ with respect to direction of motion of the first scanning carriage 29 at a speed equal to that of the first carriage divided by twice the cosine of this angle $\theta$. A reflector lens 36 and stationary mirror 37 are used to focus images of the document from mirrors 24 and 35 on the rotating surface of photoconductor drum 27.

Copier 22 also includes a paper picking station 38 which feeds individual sheets of supply paper from cassette 39 along path 40 to gating station 41, a transfer corona 42, a fusing station 43 and a copy exit area 44. Also included around drum 27 are a smoothing corona 45, an erase lamp 46 and a developer/cleaner 47.

OPTICS PARKING MECHANISM

The photoconductive surface of drum 27 may be discontinuous in an area and the leading edge of each copy is placed on a given position around this drum. The operation of various devices, such as the picking and feeding of supply paper and documents, is timed by the rotation of this drum 27. It is particularly important that the scanning motion of mirror carriage 29 be synchronized with the rotation of this drum 27 whenever this carriage is not in its stationary position (as shown) to view documents driven by feeder 20.

The stopping of this carriage 29 in the appropriate position for use of the document feeder 20 will now be described in reference to FIGS. 3 through 4B. When this feature is selected with the machine in a scanning copy mode, solenoid 48 is activated, pulling upward on crank 49 against the force of extension spring 50. However, in the scanning mode, this crank 49 is in position 51' as shown in FIG. 4B, so its motion is generally stopped by tab 52 of interposing crank 53. The main drive motor (not shown) is also activated to drive drum 27 and pulley 54 on their common drive shaft 55. Toothed belt 56, therefore, drives clutch input pulley 57, which is attached to driving dog 58. In this optics driving mode, extension spring 59 holds clutch actuation plate 60, rotated slightly in the direction of arrow 61, with respect to clutch output plate 62, which is itself attached by means of hollow shaft 63 to optics drive pulley 33. Both drive pawls 64 and 65 are thereby held inward in contact with the driving surfaces of drive dog 58 by the position of slot 66 in actuation plate 60, through which tab 67 of link 68 operates.

Both of these pawls 64 and 65 are pivotably mounted on clutch output plate 62, so their contact with the driving surfaces of drive dog 58 assures that the two pulleys 33 and 57 rotate together.

Figure 3:
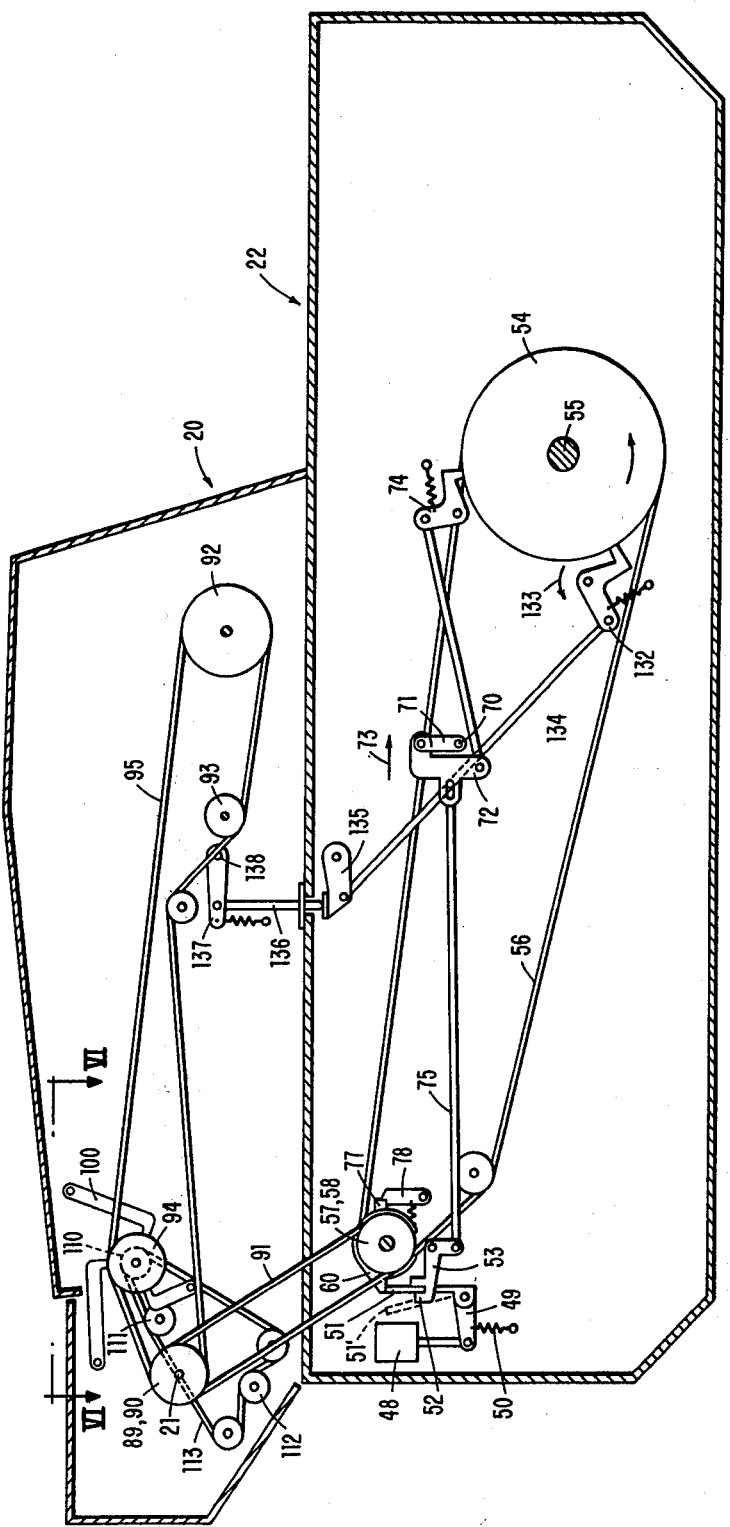
FIG. 3 is a diagrammatic view of the rear of the copier and of the document feeder showing various drive and actuation means.
Figure 4B:
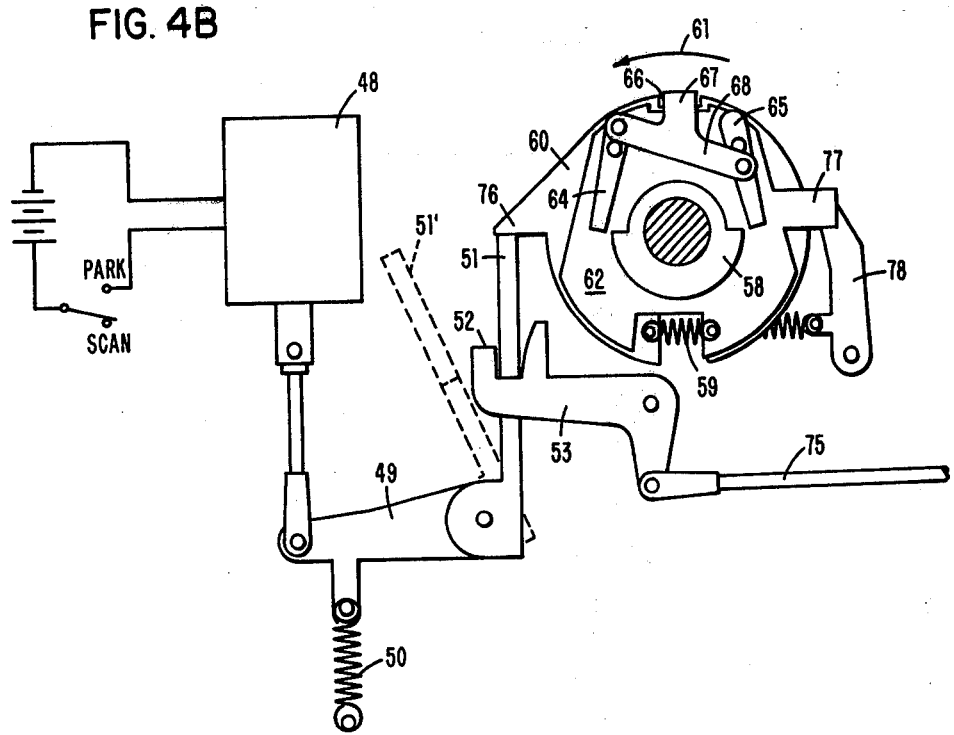
FIG. 4B is a cross-sectional view of this clutch taken along section line V—V in FIG. 4A.
Figure 4A:
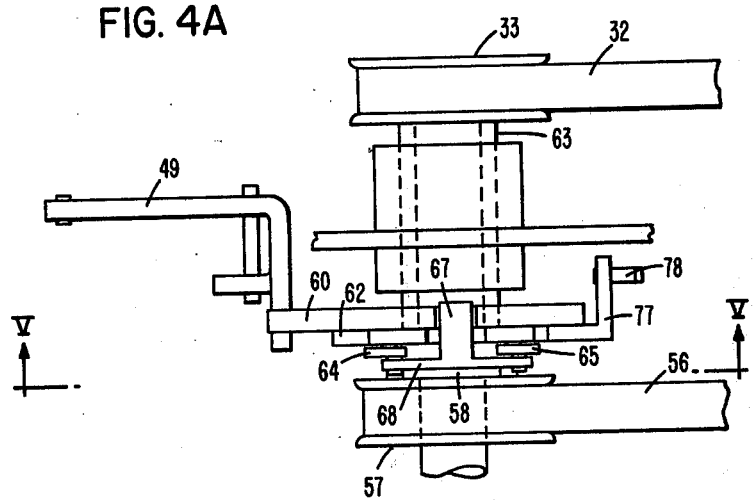
FIG. 4 is a top view of the clutch means used to engage the optics either to scan a stationary document or to stop for viewing a document driven by the feeder.

Referring to FIG. 2, as carriage 29 approaches its appropriate stopping point at the right-most extreme of its travel, it contacts lever 69 which thereby rotates on a common shaft 70 with crank 71, shown in FIG. 3. This motion pulls the upper end of differential lever 72 in the direction of arrow 73. Also, as the proper position for stopping is approached, follower crank 74 is rotated downward into a slot in a cam on photoconductor drum shaft 55. This motion pulls the lower end of differential lever 72 in the direction of arrow 73. Interlock link 75 is connected through a slot in the center of differential lever 72 in such a manner that the motion of either its upper end as driven by crank 71, or its lower end as driven by follower crank 74, does not result in the movement of this link 75.

However, when both of these motions occur, this link 75 is pulled in the direction of arrow 73 so that tab 52 of interposing crank 53 is rotated downward to clear crank 49, shown in FIG. 4B, whereupon the force supplied by solenoid 48 rotates this crank from position 51' to the position in which it is shown. The upper portion of this crank 49 is now in position to contact tab 76 of clutch actuation plate 60. A continued slight rotation of clutch output plate 62 in the direction of arrow 61 disengages driving pawls 64 and 65 due to the operation of tab 67 of link 68 through slot 66 in plate 60. This rotation also drives tab 77 of output plate 62 over the latching notch of latch 78. The clutch output plate 62 and the optics drive pulley 33 are now stopped and held in the appropriate position for copying documents fed by the document feeder 20, and the clutch input pulley 57 is free to turn without affecting the position of the optical elements.

DESCRIPTION OF THE DOCUMENT FEEDER

Referring to FIG. 2, the document feeder 20 includes an upper tray 80 into which the stack of documents to be copied is placed faceup. A number of belts 81 extends across the floor 82 of this tray between drive rollers 83 and idler rollers 84. The left edge of this tray is formed by a gate 85 attached to a sliding carriage 86, which is manually positioned to accommodate this tray 80 to the length of documents being fed. An upper cover 87, pivoted along its rear edge, is provided to allow reliable restacking of documents in this tray 80. Tabs in the upper edge of gate 85 extend into slots in cover 87 to provide sealing for restacking.

When this feature is selected, the main drive motor (not shown) is turned on so that photoconductor drum 27 is rotated. Referring to FIG. 3, the rotation of this drum on its shaft 55 causes the rotation of clutch input pulley 57 by means of toothed belt 56. A document feeder drive pulley 88, attached to the latter pulley 57, is similarly driven. This pulley, in turn, drives pulleys 89 and 90 operating on shaft 21 by means of toothed belt 91. Pulley 90, in turn, drives document drive pulleys 92 and 93 and stack drive pulley 94 by means of toothed belt 95.

Figure 5A:
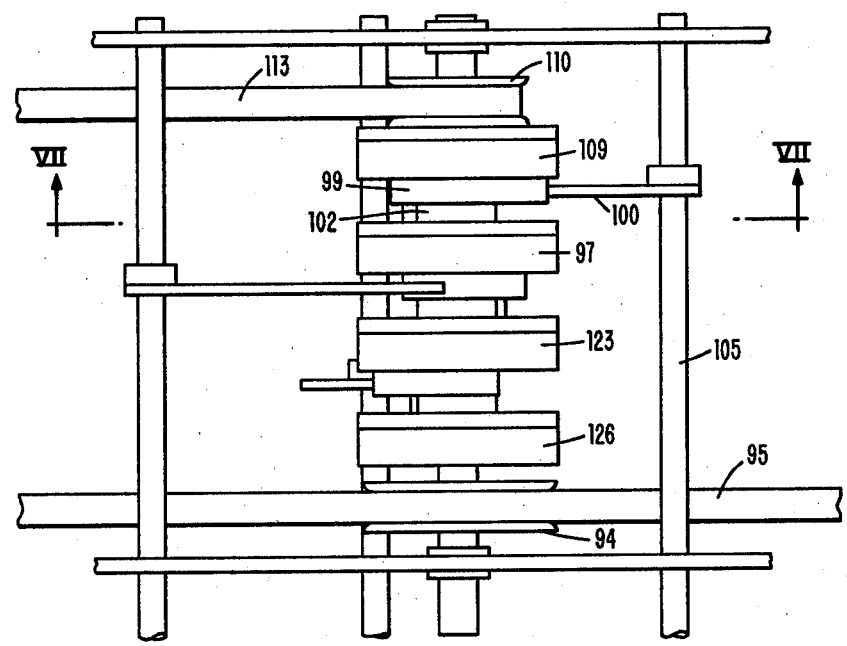
FIG. 5A is a top view of the clutch assembly used to actuate the feeding of a stack of documents, taken as shown along line VI—VI in FIG. 3.
Figure 5B:
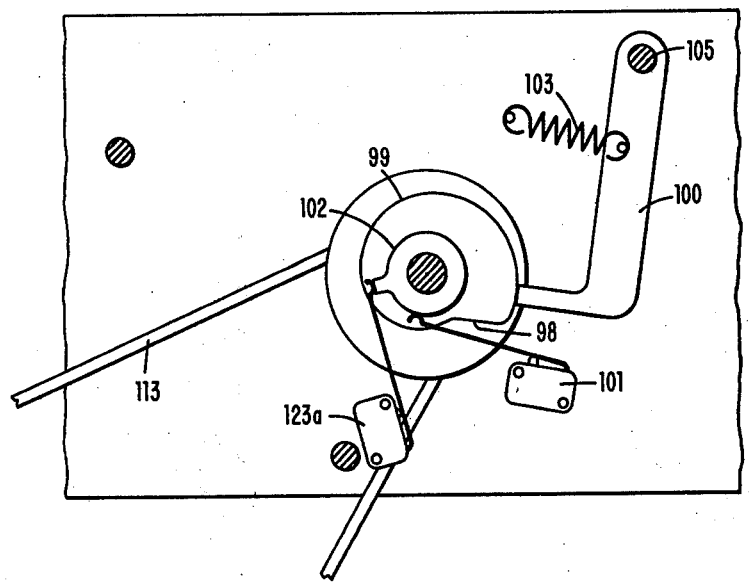
FIG. 5B is a section view of one of these clutches, taken along section line VII—VII in FIG. 5A.

When the "start" button (not shown) is depressed with this feature selected, the first portion of the document feeding cycle consists of moving the entire stack of documents from the upper tray 80 to the lower tray 96. To start this motion, the first idler clutch 97, shown in FIGS. 5A and 5B and driven by stack drive pulley 94, is actuated to drive the step 98 of its associated cam 99 past the tip of following crank 100 by the rotation of this cam 99 until switch 101 is activated by surface 102 of cam 99. The activation of this switch 101 causes the disengagement of this clutch 97 with the cam follower 100 pulled downward by extension spring 103. Referring to FIG. 2, this motion allows the downward motion of crank 104, which is pivoted on a common shaft 105 with following crank 100 so that idler roller 106 is held on the top of the stack of documents in tray 80 by the force exerted by extension spring 103. The stack of documents is thus squeezed between idler roller 106 and one of the belts 81, which is locally backed up by an idler roller 107. This sequence makes the associated hardware ready to drive the stack of documents leftward from tray 80.

The activation of switch 101 further causes the activation of solenoid 108, which rotates gate 85 open, and the activation of stack drive clutch 109, which is also driven by stack drive pulley 94. The activation of this clutch 109 rotates the drive pulley 110, which drives upper stack drive pulley 111 and lower stack drive pulley 112 by means of toothed belt 113. Upper stack drive pulley 111 is attached to the shaft of drive rollers 83, so its rotation causes belts 81 to drive the stack of documents leftward. Lower stack drive pulley 112 is attached to the shaft of rollers 114, which drives another set of belts 115 extending across the lower tray 96 to idler rollers 117. Also on the shaft driven by lower stack drive pulley 112 is a plurality of pulleys 118, which drives toothed belts 119. Each of these belts is constrained by pulley guides 120 and backing guides 121 to retain the curved shape shown. Thus, when stack drive clutch 109 is activated, the various surfaces to be contacted by the stack of documents 500-510 are driven at an essentially uniform speed in the desired direction of movement.

When the stack of documents 500-510 is driven far enough to the left to activate switch 122, another clutch 123 is activated so that idler roller 124 is lowered onto the stack in a manner analogous to that described for roller 106, and when the stack is further driven to actuate switch 125, another clutch 126 is activated to similarly lower idler roller 127. Switches 122 and 125 are located relative to their associated idler rollers 124 and 127 so that the rollers are not lowered until after the leading edge of the document stack passes below them. Thus, the rollers 124 and 127 are used to insure the positive driving of the document stack without interfering with a portion of it.

The end of the driving of the document stack 500-510 is sensed by the actuation of switch 128, whereupon stack drive clutch 109 is deactivated. The cams associated with clutches 97, 123 and 126 are returned to their original positions by the activation of these clutches until switches, such as switch 128a, are actuated, thereby raising rollers 106, 124 and 127.

The stack of documents 500-510 is now in place in the lower tray 96, with all sides to be copied facedown and with the last document 510 on top. A driven separating wheel 128' is now lowered on top of this stack by a solenoid mechanism 129. This wheel drives the top document until switch 130 is actuated, whereupon this wheel 128' is raised to leave the leading edge of the separated document resting against gate 131.

From this point, the synchronization of the document feed with the rotation of photoconductor drum 27 is achieved by a mechanism shown in FIG. 3. At the position required for subsequent leading edge registration, cam follower crank 132 is rotated in the direction of arrow 133 to allow downward motion of link 134 and, thereby, of crank 135, pin 136 and crank 137. This rotates the shaft 138, attached to crank 137, opening gate 131 and, by means of link 139, raises idler roller wheel 140 so that the leading edge of the document 510 is gripped against the rotating surface of first drive roll 141. The document 510 is propelled by roll 141 to the exposure area 142 where it is copied, and into the nip formed by second drive roll 143 and belt 144. The toothed belt 95 drive these rolls 141 and 143 at a suitable rate for copying by stationary optics 600. The document 510 is further propelled upward, with the assistance of belts 144 and 145, to be deflected by plate 146 into upper tray 80. Stacking crank 147 is driven by a solenoid (not shown) into position 147' to aid stacking by pushing the trailing edge of the document.

Thus, the documents 500-510 are fed in seriatim past the exposure area 142 to be restacked in the upper tray 80. When all of the documents in lower tray 96 have thus been fed, the stack is moved again as described before for the copying of a second set. The entire process can be repeated as often as required to make the desired number of sets.

MECHANISM FOR RETURNING THE OPTICS TO ITS SCANNING MODE

In FIG. 2, following the use of the document feeder feature, the machine may be used for copying stationary documents by raising the document feeder 20 about its pivot 21 and by placing such documents atop glass platen 23. A foam cover 147a forms a portion of the bottom of this feeder 20 to aid in the copying of such documents. When the appropriate start button (not shown) is depressed, the main drive motor (also not shown) is turned on to start the rotation of photoconductor drum 27. Solenoid 48 (FIG. 3) is deactivated so crank 49 is pulled downward by extension spring 50. Since the first carriage 29 has been left in the position used for copying documents moving through feeder 20, crank 69 rotates the upper end of differential crank 72 in the direction of arrow 73. However, generally, the photoconductor drum 27 is not in the correct position for the synchronous engagement of the optics drive, so cam follower crank 74 prevents the downward rotation of interposing crank 53 and thus the return of crank 49 to its position 51′. When this position is reached, these rotations occur and the release of tab 76 of clutch actuator plate 60 allows extension spring 59 to rotate pawls 64 and 65 so that clutch output plate 62 is engaged with driving dog 58, thereby engaging the scanning optics drive.

DESCRIPTION OF THE OPERATION

Operation of the invention will now be described with reference to the figures. A stack of documents 500–510 is placed in the upper tray 80 faceup and the operator selects the recirculating automatic document feed feature. The main drive motor rotates the photoconductor drum 27 on shaft 55 which causes a belt 56 to turn clutch input pulley 57 and document feeder drive pulley 88. Document feeder drive pulley 88 causes toothed belt 91 to drive pulley 89. In turn, pulley 89 turns the shaft 21 which turns pulley 90. Pulley 90 causes the toothed belt 95 to drive document drive pulleys 92 and 93 and stack drive pulley 94.

When the start button is pushed, the stack of original documents 500–510 is moved from the upper tray 80 to the lower tray 96. Stack drive pulley 94 drives first idler clutch 97 to activate switch 101. Switch 101 disengages clutch 97 and leaves cam follower 100 biased toward the left. Cam follower 100, in turn, holds idler roller 106 on top of the stack in tray 80. Next, the stack of documents 500–510 is driven leftward from tray 80.

Stack drive clutch 109 is activated and the various surfaces to be contacted by the stack of documents 500–510 are driven at an essentially uniform speed in the desired direction of movement. The stack of documents 500–510 is placed in the lower tray 96, with all sides to be copied facedown and with the last document 510 on top. The leading edge of the document 510 is gripped against the rotating surface of first drive roll 141 and to the exposure area 142 where it is copied, and into the nip formed by second drive roll 143 and belt 144. The toothed belts 95 drive these rolls 141 and 143 at a suitable rate for copying by stationary optics 600. Thus, the documents 500–510 are fed in seriatim past the exposure area 142 to be restacked in the upper tray 80. When all the documents in lower tray 96 have thus been fed, the stack is moved again as described before for the copying of a second set. The entire process can be repeated as often as required to make the desired number of sets.

While the invention has been particularly shown and described with reference to a preferred embodiment thereof, it will be understood by those skilled in the art that various changes in form and details may be made therein without departing from the spirit and scope of the invention.

What is claimed is:

1. A copier, including:
   copier optics for scanning documents to be copied;
   a first document tray for holding a stack of original documents with all their faces, carrying matter to be copied, oriented in a first direction;
   a second document tray for receiving the stack of original documents with all their faces, carrying matter to be copied, oriented in a second direction;
   means for substantially simultaneously transferring, along a first path removed from the copier optics, all the documents from the stack in the first document tray and placing the documents in the second document tray to form the stack in the second document tray; and
   a transport device for sequentially transferring, along a second path past the copier optics, documents from the top of the stack in the second document tray to reconstruct the stack of original documents in the first document tray.

2. A copier, including:
   copier optics for scanning documents to be copied;
   a first document tray for holding a stack or original documents with all their faces, carrying matter to be copied, oriented in a first direction;
   a second document tray for receiving the stack of original documents with all their faces, carrying matter to be copied, oriented in a second direction;
   means for sequentially transferring, along a first path past the copier optics, documents from the top of the stack in the first document tray and placing the documents in the second document tray to form the stack in the second document tray; and
   a transport device for substantially simultaneously transferring, along a second path removed from the copier optics, all the documents from the stack in the second document tray to reconstruct the stack of original documents in the first document tray.

3. The copier of claims 1 or 2 wherein the documents in the upper tray are oriented in a faceup direction, and the documents in the lower tray are oriented in a facedown direction.

4. The copier of claim 2 wherein the transport device includes means for moving a first of the trays into a position above the other tray so as to transfer the stack from the first to the other tray.

* * * * *